(12) United States Patent  
Kato

(10) Patent No.: US 7,319,892 B2
(45) Date of Patent: Jan. 15, 2008

(54) SLIDE MECHANISM OF PORTABLE TERMINAL DEVICE

(75) Inventor: Hideo Kato, Kanagawa (JP)

(73) Assignee: Katoh Electrical Machinery Co., Ltd., Yokohama, Kanagawa (JP)

( * ) Notice: Subject to any disclaimer, the term of this patent is extended or adjusted under 35 U.S.C. 154(b) by 482 days.

(21) Appl. No.: 10/983,067

(22) Filed: Nov. 5, 2004

(65) Prior Publication Data

US 2005/0164753 A1   Jul. 28, 2005

(30) Foreign Application Priority Data

Jan. 26, 2004   (JP) .............................. 2004-017681

(51) Int. Cl.
*H04M 1/00* (2006.01)
(52) U.S. Cl. ............................... 455/575.4; 455/550.1; 379/433.12
(58) Field of Classification Search ............. 455/575.4, 455/550.1, 90.3, 575.1, 575.8, 66.1, 73; 379/433.12, 379/433.01, 433.11
See application file for complete search history.

(56) References Cited

U.S. PATENT DOCUMENTS

| | | | |
|---|---|---|---|
| 6,748,249 B1* | 6/2004 | Eromaki et al. ......... | 455/575.4 |
| 7,003,104 B2* | 2/2006 | Lee ........................ | 379/433.13 |
| 2002/0132633 A1* | 9/2002 | Johnson et al. ............. | 455/550 |
| 2003/0003962 A1* | 1/2003 | Vooi-Kia et al. ............ | 455/566 |
| 2004/0005908 A1* | 1/2004 | Crisp ...................... | 455/550.1 |
| 2005/0009582 A1* | 1/2005 | Vooi-Kia et al. ......... | 455/575.4 |
| 2005/0054397 A1* | 3/2005 | Kim et al. ................ | 455/575.4 |
| 2006/0154703 A1* | 7/2006 | Kim ........................ | 455/575.4 |

FOREIGN PATENT DOCUMENTS

JP   2003-125052   4/2003

* cited by examiner

*Primary Examiner*—Sonny Trinh
(74) *Attorney, Agent, or Firm*—Notaro & Michalos P.C.

(57) ABSTRACT

In a mechanism which relatively slides a first casing and a second casing of a portable terminal device in a state that the casings are laid over each other in a vertical direction, in order to attain a slide mechanism which is simply structured and structured to enable open/close operation of the first casing and the second casing to be automatically conducted from predetermined slide positions of the both casings, the mechanism relatively slides the first casing and the second casing in the state that the casings are laid over each other in the vertical direction, and is constituted with: a base member mounted on either one of the first casing and the second casing; a slider slidably mounted on the base member and mounted on the other one of the first casing and the second casing; and a resilient means, which is disposed between the slider and the base member, for slidably biasing the slider in a closing direction and/or an opening direction from predetermined slide positions, by being displaced according to a slide position of the slider. Meanwhile, the resilient means is a torsion spring and the torsion spring is mounted so that a direction of action of resilience thereof is displaced according to slide operation of the slider, by one end side of the torsion spring being pivotally supported on the base member and the other end side being pivotally supported on the slider.

5 Claims, 7 Drawing Sheets

SLIDE MECHANISM OF PORTABLE TERMINAL DEVICE

BACKGROUND OF THE INVENTION

1. Field of the Invention

The present invention relates to a slide mechanism of a portable terminal device, and this slide mechanism is suitably used when a first casing which constitutes a transmitter section and a second casing which constitutes a receiver section of the portable terminal device such as a cellular phone in particular are slidably coupled to each other.

2. Description of the Related Art

Currently on the market is a cellular phone, as one type of a portable terminal device, which has a slide mechanism for making, in a state that a first casing being a transmitter section with a keyboard portion and a microphone portion and a second casing being a receiver section with a display portion and a speaker portion are laid over each other, a state that the first casing and the second casing are completely laid over each other with the second casing covering an upper surface of the first casing and a state that the second casing is slid in a longitudinal direction along the first casing so that the upper surface of the first casing is exposed. Such a slide mechanism is publicly known as shown in Japanese Patent Application Laid-open No. 2003-125052.

The slide mechanism described in the above document is structured of two slide modules composed of a slide case made of a slide cover and a lock plate which are laid over and fixed, a slider slidably accommodated in the slide case, and a leaf spring which is resiliently disposed between the slider and the slide case. The slide modules are parallelly provided on a lower surface of the second casing, and two mounting pins are protruded from the slider to be fixed with screws on the upper surface of the first casing.

According to the above-described structure, relative open/close operation of the first casing and the second casing, or more specifically sliding operation, is required to be conducted all by hand, and therefore the above-described structure has a disadvantage in view of operationality.

SUMMARY OF THE INVENTION

An object of the present invention is to provide, in a mechanism which relatively slides a first casing and a second casing of a portable terminal device in a state that the casings are laid over each other in a vertical direction, a slide mechanism which is simply structured and structured to enable open/close operation of the first casing and the second casing to be automatically conducted from predetermined slide positions of the both casings.

In order to achieve the object stated above, the present invention is a mechanism for relatively sliding a first casing and a second casing in the state that the casings are laid over each other in a vertical direction, and is constituted with: a base member mounted on either one of the first casing and the second casing; a slider slidably mounted on the base member and mounted on the other one of the first casing and the second casing; and a resilient means, which is disposed between the slider and the base member, for slidably biasing the slider in a closing direction and/or an opening direction from predetermined slide positions, by being displaced according to a slide position of the slider. Meanwhile, the present invention is characterized in that, between the base member and the slider, a guide member guiding slide of the slider is separately provided.

Additionally, the present invention is characterized in that the resilient means is a torsion spring and the torsion spring is mounted so that a direction of action of resilience thereof is displaced according to slide operation of the slider, by one end side of the torsion spring being pivotally supported on the base member and the other end side being pivotally supported on the slider.

Further, the present invention is characterized in that the torsion spring is disposed between the base member and the slider.

Since the slider is slidably biased in a closing direction and/or an opening direction from predetermined slide positions related to the base member, the first casing and the second casing can be semi-automatically opened/closed from predetermined relative slide positions.

DETAILED DESCRIPTION OF THE PREFERRED EMBODIMENTS

Hereinafter, a case that an embodiment of the present invention is applied to a cellular phone will be described, but a slide mechanism according to the present invention can also be applied to a portable information terminal such as Zaurus (trademark) for example, a calculator, a pocket computer, a hand-held gaming device, an ashtray, a cover of a case and so forth.

Figure 1:
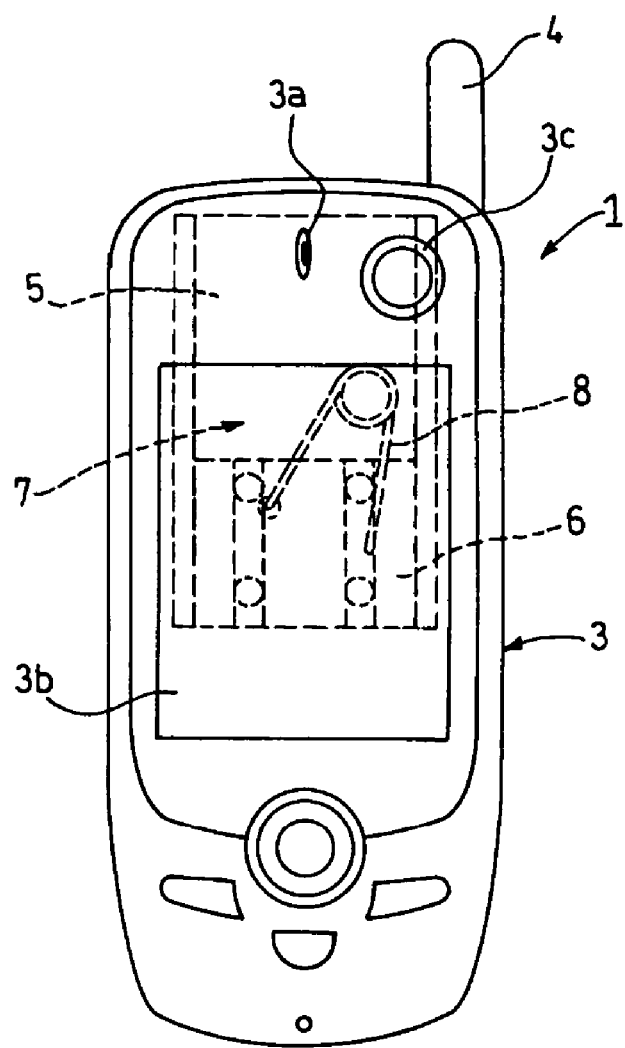
FIG. 1 is a plan view of a cellular phone as one type of a portable terminal device to which a slide mechanism according o the present invention is applied.
Figure 2:
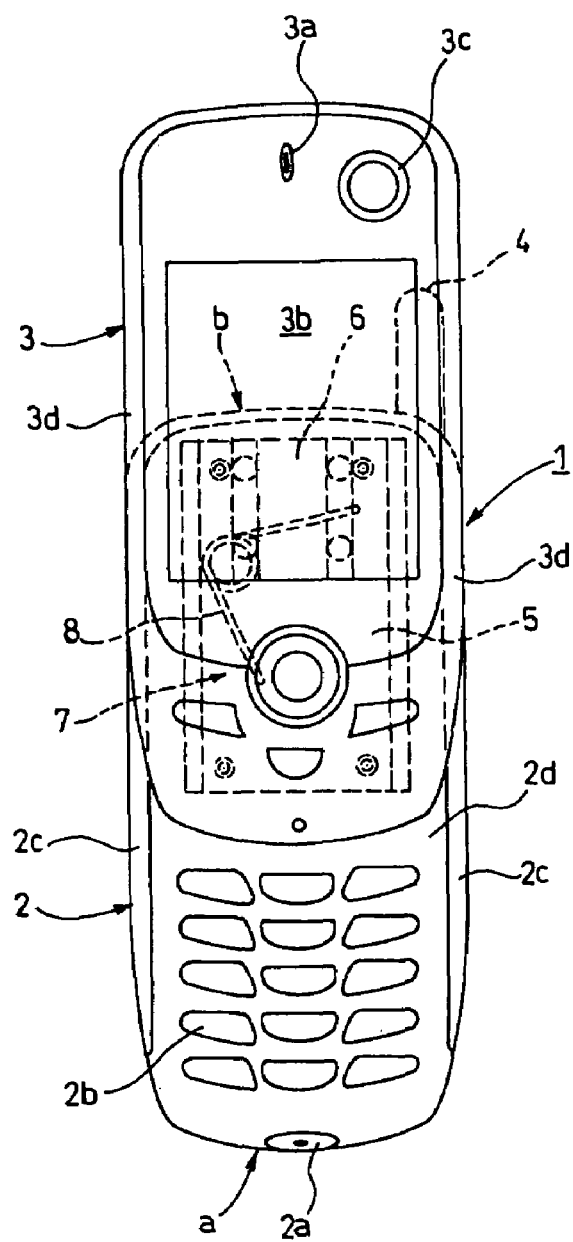
FIG. 2 is a plan view showing a state that a receiving section is slid along a transmitter section from a state shown in FIG. 1.
Figure 3:
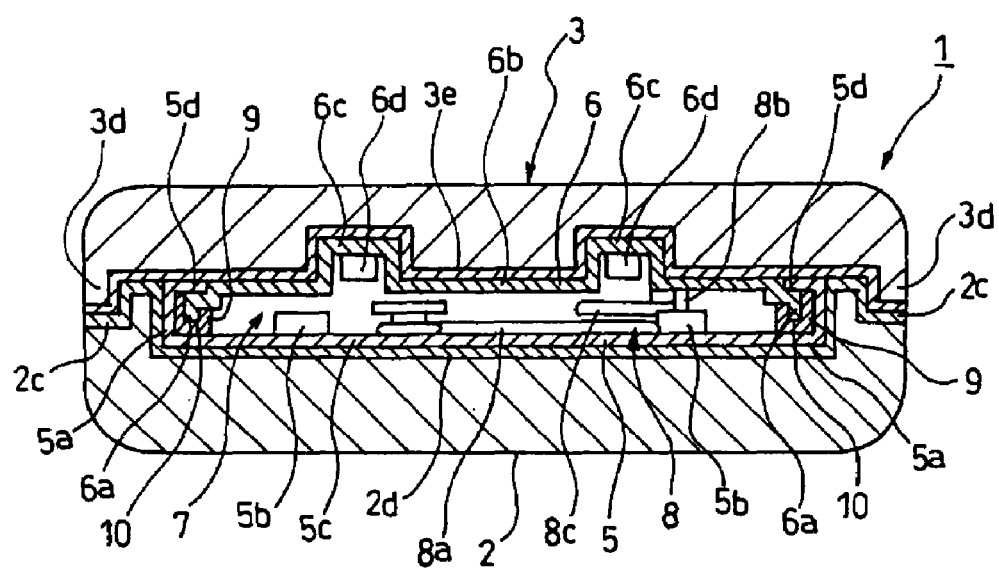
FIG. 3 is a vertical side view generally showing a state how the slide mechanism is mounted in the state shown in FIG. 1.
Figure 4:
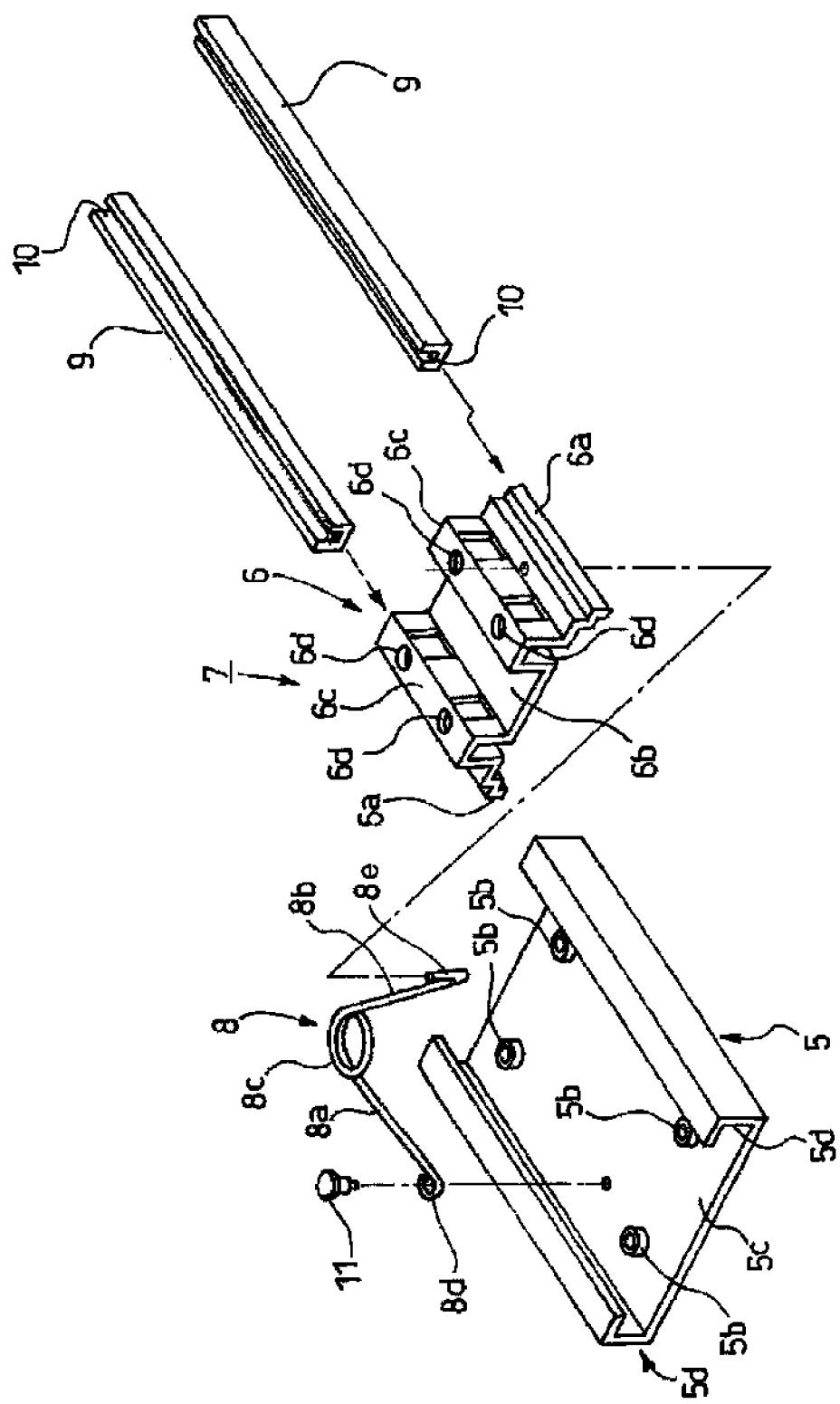
FIG. 4 is an exploded perspective view of the slide mechanism according to the present invention.

Hereinafter, the embodiment of the present invention will be described in detail based on FIG. 1 to FIG. 4. In FIG. 1 to FIG. 3 in particular, a reference numeral 2 denotes a transmitter section of the cellular phone 1 as one type of a portable terminal device, and this transmitter section constitutes a first casing. On a front surface of the first casing 2, a microphone portion 2a and a keyboard portion 2b are provided. Laid over an upper part of the first casing 2 and mounted slidably in a longitudinal direction by the slide mechanism according to the present invention is a receiver section of the cellular phone 1 for example. The receiver section constitutes a second casing 3. On a front surface of the second casing 3, a speaker portion 3a, a display device 3b, and a camera portion 3c are provided. Incidentally, a reference numeral 4 denotes an antenna. The antenna 4, being mounted on the first casing 2 side, can be mounted on the second casing 3 side.

Next, a structure of the slide mechanism 7 according to the present invention will be described. On both sides of the upper part of the first casing 2, as shown in FIG. 3 in particular, platform portions 2c, 2c are provided. On both sides of a lower part of the second casing 3, slide portions 3d, 3d which are slidably engaged with the platform portions 2c, 2c are provided. Incidentally, the platform portions 2c, 2c and the slide portions 3d, 3d can be omitted, since in the slide mechanism 7 according to the present invention a base member 5 is wide enough for a slider 6 which is slidably mounted thereon not to wobble in a horizontal direction.

Next, the slide mechanism 7 is constituted with the wide base member 5 which is mounted on an upper cover 2d side of the transmitter section 2 being the first casing, the slider 6 which is slidably engaged with guide portions 5a, 5a that are provided on the base member 5, and a resilient means 8 of for example a torsion spring, which is disposed between the slider 6 and the base member 5, for slidably biasing the slider 6 in a closing direction and an opening direction from predetermined slide positions related to the base member 5. The above-described guide portions 5a, 5a are, in this embodiment, constituted with a pair of guide members 9 which have guide grooves 9a and are structured separately of the base member 5, but can be integrally formed with the base member 5.

The base member 5 in the embodiment is made of a press-worked stainless steel plate, but can also be a synthetic resin molded product. The base member 5 is formed of a base plate portion 5c on which female screw portions 5b are provided for mounting on the transmitter section 2, and mounting grooves 5d, 5d which are integrally provided on both sides of the base plate portion 5c. Incidentally, the mounting grooves 5d, 5d themselves can be used as guide grooves for the slider 6.

The slider 6 in this embodiment is made of a press-worked stainless steel plate, but can also be a synthetic resin molded product. The slider 6 is mounted on a lower cover 3e of the receiver section 3. The slider 6 is constituted with a base plate portion 6b with guide piece portions 6a, 6a provided on both sides thereof, and two rows of mounting portions 6c, 6c which are elevated on the base plate portion 6b. On the mounting portions 6c, 6c, female screw portions 6d, 6d for mounting the mounting portions 6c, 6c on the receiver section 3 side are provided.

The resilient means 8 in the embodiment is structured of the torsion spring which is always given a resilience in an opposite direction of a wound direction, and at a tip of one operating part 8a thereof a ring portion 8d is provided, and this ring portion 8d is rotatably fixed via a fixing pin 11 on an upper surface of the base member 5 and a locking portion 8e made of a tip of the other operating part 8b bent toward a wound part 8c is rotatably fixed on a lower surface of the slider 6. The wound part 8c of the resilient means 8 is displaced according to a slide position of the slider 6 related to the base member 5, and the resilient means 8 operates to slidably bias the slider 6 at a starting position in a direction of the starting position and to slidably bias the slider 6 at an ending position in a direction of the ending position. Incidentally, as the resilient means, a rotary torque generating hinge, a compression spring, a helical extension spring and the like can also be used, though a sliding direction thereof related to the slider is unilateral.

The guide members 9 are, for example, plastic molded products, but in view of durability other materials such as sintered metal and press-worked product and so forth can be used. Forming theses guide members 9 as separate parts (separately) of the base member 5 is advantageous in that an improved operation feeling of the slider 6 and absorption of wobbling are easily attainable.

Figure 5:
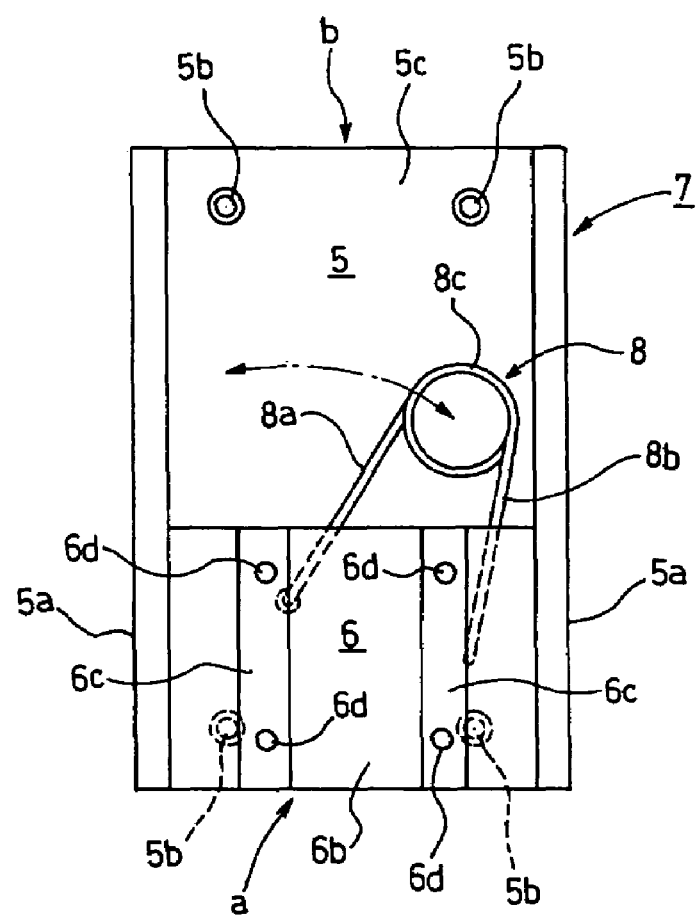
FIG. 5 is an explanatory view showing an operation of the slide mechanism according to the present invention.
Figure 6:
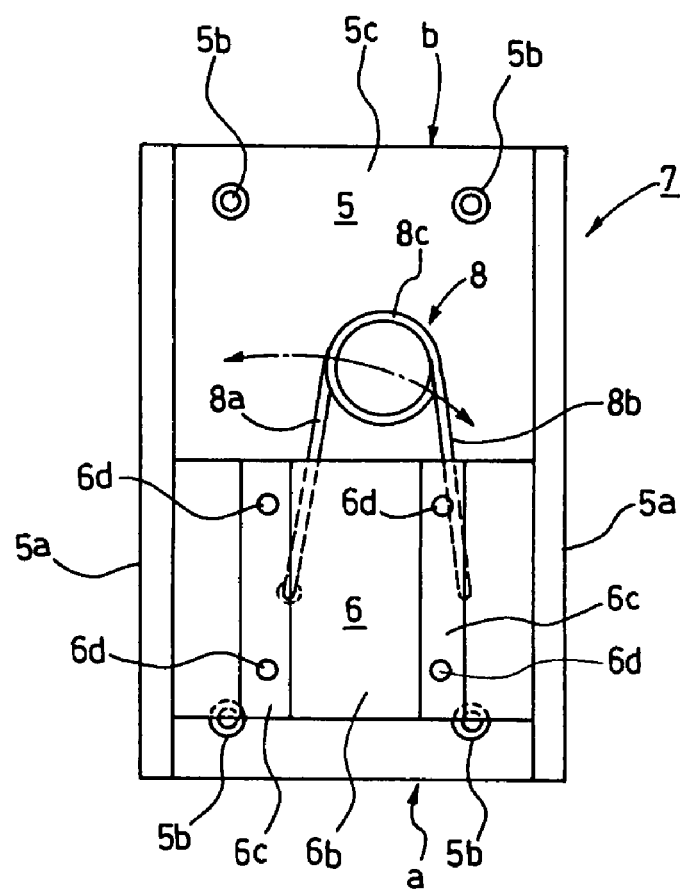
FIG. 6 is an explanatory view showing an operation of the slide mechanism according to the present invention.
Figure 7:
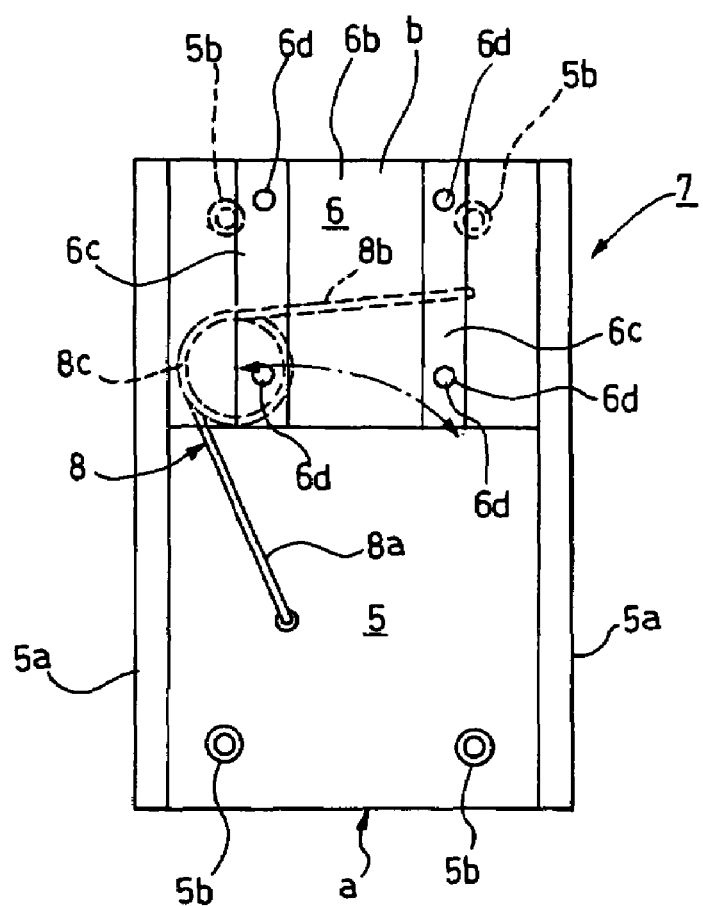
FIG. 7 is an explanatory view showing an operation of the slide mechanism according to the present invention.

FIG. 5 to FIG. 7 show operation of the above-described slide mechanism. As shown in the drawings, when the slider 6 is at the starting position "a" of the base member 5, because of a position of the wound part 8c of the resilient means 8 the slider 6 is slidably biased in the starting position "a" by the operating parts 8a and 8b as shown in FIG. 5. Therefore, as shown in FIG. 1, the transmitter section 2 and the receiver section 3 are locked in a closed state.

When the slider 6 is pushed from this state in the direction of the ending position "b", the slider 6, being guided by the guide members 9 which constitute the guide portions 5a, starts sliding on the base member 5 in the direction of the ending position "b". Consequently, as shown in FIG. 1 and FIG. 2 the receiver section 3 slides along the transmitter section 2, exposing the upper surface of the transmitter section 2. In this intermediate sliding state, the resilient means 8 is turning the wound part 8c in a left direction on a fulcrum of a pivotally supporting part of the operating part 8a, but as shown in FIG. 6 the resilient means 8 is not slidably biasing the slider 6 in either direction. Therefore, the receiver section 3 can be stopped in a free-stop way along the transmitter section 2.

When the slider 6 is further pushed in the direction of the ending position "b", the position of the wound part 8c of the resilient means 8 is turned in a further left direction. Consequently, the slider 6 comes to be slidably biased in the direction of the ending position "b" of the base member 5 by the operating parts 8a and 8b. As a result the receiver section 3 automatically slides to a fully-open position related to the transmitter section 2 as shown in FIG. 2, exposing an entire upper surface of the keyboard portion 2b of the transmitter section 2. As shown in FIG. 7, since the slider 6 at this fully-open position is being slidably biased by the resilient means 8 in the direction of the ending position "b", the slider 6 becomes in a locked state at this position. Therefore, the receiver section 3 does not spontaneously return in a direction of an original position.

When the receiver section 3 is to be closed on the transmitter section 2, the receiver section 3 is pushed in a direction of the starting position "a". Though at the beginning the slider 6 is being closed against the resilience of the resilient means 8, by a displacement of the wound part 8c of the resilient means 8 the resilient force ceases and subsequently the slider 6 can be closed in the free-stop way. When the slide position approaches the starting position "a", because of the displacement of the wound part 8c of the resilient means 8 the slider 6 is slidably biased in the direction of the starting position "a". Consequently, the receiver section 3 is automatically closed on the transmitter section 2.

In a way described above, the receiver section 3 being the second casing is semi-automatically opened/closed on the transmitter section 2 being the first casing. Incidentally, the base member 5 and the slider 6 can be mounted conversely to the above embodiment, i.e., the base member 5 can be mounted on the receiver section 3 being the second casing and the slider 6 can be mounted on the transmitter section 2 being the first casing.

Sliding movement of the first casing 2 and the second casing 3 is relative and not unilateral. Stopping positions (not shown) of the slider 6 at the starting position "a" and the ending position "b" can be designated by appropriately providing stopper means on the base member 5, the first casing, or the second casing.

It is optional, in order for the slider 6 to have a friction characteristic, to provide a resilient means such as a leaf spring and the like on a sliding part of the slider 6 or on other parts.

As described in detail above, the slide mechanism according to the present invention is simply structured, and has improved operationality since the second casing can be semi-automatically slid open/closed on the first casing. Therefore, the slide mechanism according to the present invention is suitably used for a slide mechanism of a cellular phone in particular among portable terminal devices.

What is claimed is:

1. A slide mechanism of a portable terminal device which is a mechanism for relatively sliding a first casing and a second casing in a state that the casings are laid over each other in a vertical direction, said slide mechanism comprising:
   a base member mounted on either one of the first casing and the second casing;
   a slider slidably mounted on said base member and mounted on the other one of the first casing and the second casing; and
   a resilient means, which is disposed between said slider and said base member, for slidably biasing said slider in a closing direction and/or an opening direction from predetermined slide positions, by being displaced according to a slide position of said slider;
   wherein, between said base member and said slider, a guide member guiding slide of said slider is separately provided; and
   wherein said resilient means is a torsion spring and the torsion spring is mounted so that a direction of action of resilience thereof is displaced according to slide operation of said slider, by one end side of the torsion spring being pivotally supported on said base member and the other end side of the torsion spring being pivotally supported on said slider.

2. The slide mechanism according to claim 1, wherein said guide member comprises a pair of guide grooves provided on both sides of said slider for guiding guide piece portions, and is mounted to two rows of mounting portions elevated on both sides of said base member.

3. The slide mechanism according to claim 1, wherein said torsion spring provided with a ring portion on said one end side of the torsion spring, and said ring portion is pivotally supported on said base member via a fixing pin, so as to be rotatable.

4. The slide mechanism according to claim 1, wherein the torsion spring is disposed between said base member and said slider.

5. The slide mechanism according to claim 1, wherein a space portion is provided between said slider and said base member, for accommodating said torsion spring and allowing for displacement thereof.

* * * * *